United States Patent [19]

Yang et al.

[11] Patent Number: 5,131,076
[45] Date of Patent: Jul. 14, 1992

[54] CHINESE PICTOGRAPH OR GRAPHIC GENERATING DEVICE MOUNTED ON A PRINTER PORT

[75] Inventors: Jen-Tsun Yang; Ming-Tao Lin; Yun-Tsai Chen, all of 3F-1 No. 38, Lane 151, Sec. 4, Jen-Al Rd., Taipei, Taiwan

[73] Assignee: Eastern Graphics Technology Co., Ltd., Taipei, Taiwan

[21] Appl. No.: 772,545

[22] Filed: Oct. 7, 1991

[51] Int. Cl.⁵ ........................... G06K 15/00
[52] U.S. Cl. .................... 395/110; 395/112; 395/114
[58] Field of Search ............... 395/101, 110, 112, 114, 395/100, 500; 346/154, 150; 400/70, 76, 62, 61

[56] References Cited

U.S. PATENT DOCUMENTS 4,122,520 10/1978 Adamchick et al. ............... 395/100
4,641,263 2/1987 Perlman et al. ..................... 395/500

*Primary Examiner*—Arthur G. Evans
*Attorney, Agent, or Firm*—Bacon & Thomas

[57] ABSTRACT

A chinese pictograph or graphic device mounted on a printer port, to which modular design is applied with no need of changing the printer port interface of personal computers PC and printers, this device can be externally mounted, as required, between the printer port interface of a PC and the parallel interface of its printer. With this newly-designed device, the PC can sent forth control signals and status signals to generate pictographic data which can be transmitted to the invented device by way of data bus, and the data, after being processed in the invented device, can be transferred to required pictures or graphics and sent back to the printer port of a PC, thus the PC can read out the required pictures or graphic from its printer port, the PC also can order the printer to print the data which transmitted by data bus no need of the procession of the invented device. Such a invented device can improve the advantages of a conventional design and exert high efficiency, and more particularly becomes the only means to remedy the disadvantages of lap-top and notebook-type personal computers.

5 Claims, 2 Drawing Sheets

CHINESE PICTOGRAPH OR GRAPHIC GENERATING DEVICE MOUNTED ON A PRINTER PORT

BACKGROUND OF THE INVENTION

This invention is related to a Chinese pictograph or graphic generating device mounted on the printer port, especially to a chinese pictograph or graphic generating device mounted on the printer port to be externally installed between a PC and its printer.

Today, personal computers have been successfully developed into daily used installations and are widely needed in professional fields as they can work as efficiently as human brains and carry on calculation at an amazingly rapid speed. Nevertheless, end-users require further improved quality, especially the quality of character typeface. A conventionally-designed PC, which memorizes graphic data in a hard disk drive in its master computer, can only provide one kind of typeface (standard script) in one size because of the limited capacity of the disk, and are unable to perfectly control the quality of enlarged or reduced graphics or pictures.

Although some manufacturers have supplied a pictograph generating card to remedy the aforesaid disadvantages, as the generating card should be a built-in style in the PC, it is only available in certain brands of PC's and should be installed and maintained by professional technicians. For all the inconvenience, this generating card is not yet widely accepted. Besides, the card cannot be used in a lap-top or a notebook-type PC, either of which has too complicated internal structure and too small a space to contain this card. As a result, both these two types of portable PC's can hardly satisfy end-users with multiple-type characters, though they must be hot objects on the future market.

SUMMARY OF THE INVENTION

Having been aware of the mentioned disadvantages, the inventor of this invention with accumulated experience in working with computer design was dedicated to research and development of a generating device which could be easily installed and maintained and could supply several kinds of high-quality typeface at a higher speed. After years of unsparing efforts, the inventor now introduces a Chinese pictograph or graphic generating device mounted on a printer port, to which modular design is applied with no need of changing the printer port interface of personal computers PC and printers, this device can be externally mounted, as required, between the printer port interface of a PC an the parallel interface of its printer. With this newly-designed device, the PC can sent forth control signals and status signals to generate pictographic data which can be transmitted to the invented device by way of data bus, and the data, after being processed in the invented device, can be transferred to required pictures or graphics and sent back to the printer port of a PC, thus the PC can read out the required pictures or graphic from its printer port, the PC also can order the printer to print the data which transmitted by data bus no need of the procession of the invented device. Such a invented device can improve the advantoges of a conventional design and exert high efficiency, and more particularly becomes the only means to remedy the disadvantage of lap-top and notebook-type personal computers.

BRIEF DESCRIPTION OF THE DRAWINGS

This and other objects and features of the invention will become more apparent from the following description taken in connection with the accompany drawings wherein.

DETAILED DESCRIPTION OF THE PREFERRED EMBODIMENT

Figure 1:
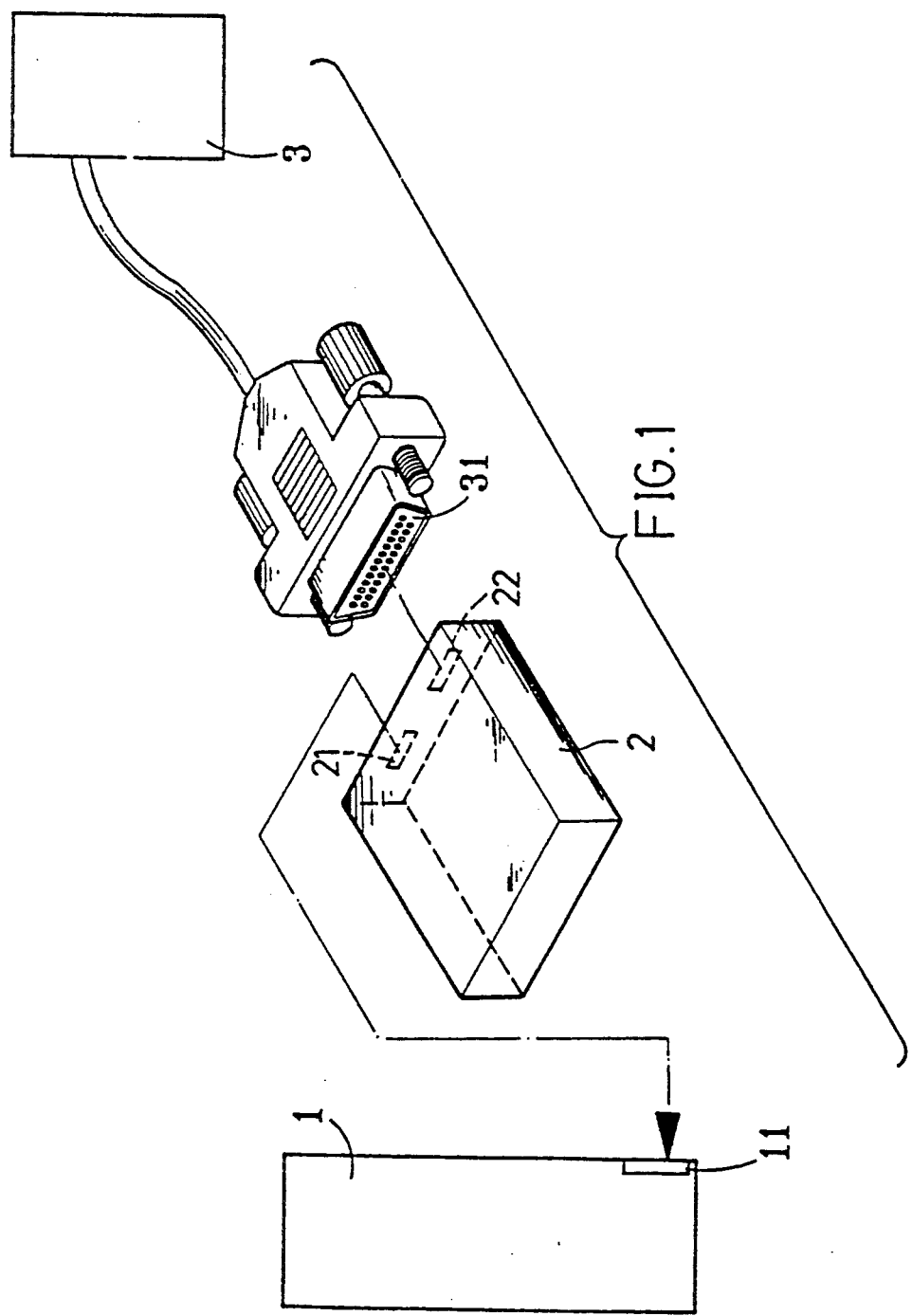
FIG. 1 illustrating a schematic drawing showing the invented Chinese character pictograph or graphic generating device mounted on a printer port to be connected between a PC and its printer.

Referring to FIG. 1, in which a schematic drawing shows the newly-invented chinese pictograph or graphic generating device mounted on a printer port to be connected between a PC and its printer, at the Left end of this device 2 is mounted a D-shape transfer device 21 with two sides directly connected with the printer port 11 of the master computer of the PC 1, at the right end of this device 2 is mounted another D-shape transfer device 22 to be connected with the extension cord 31 of the printer 3 so that when any character pictures or graphics are selected, the PC 1 gives an instruction to the device 2, and the device 2 generates dot matrix typeface or data required to describe framed characters based on the received instructions including pictographs, typeface and size of characters. The generated data are then transmitted back to the PC 1 for other processing. As the PC 1 can be connected with the device 2 all the time, no matter whether they have any connection in working, the PC 1 can order the printer 3 to work directly. Moreover, as the device 2 is constructed based on modular design, neither the PC's nor the printers should be changed their printer port interface, and as the device 2 can be mounted outside the PC 1 and the printer 3, as required, the capacity can be expanded as large as possible, thus the disadvantages of conventionally-designed personal computers are overcome and ther merits of the design are optimized accodingly.

Figure 2:
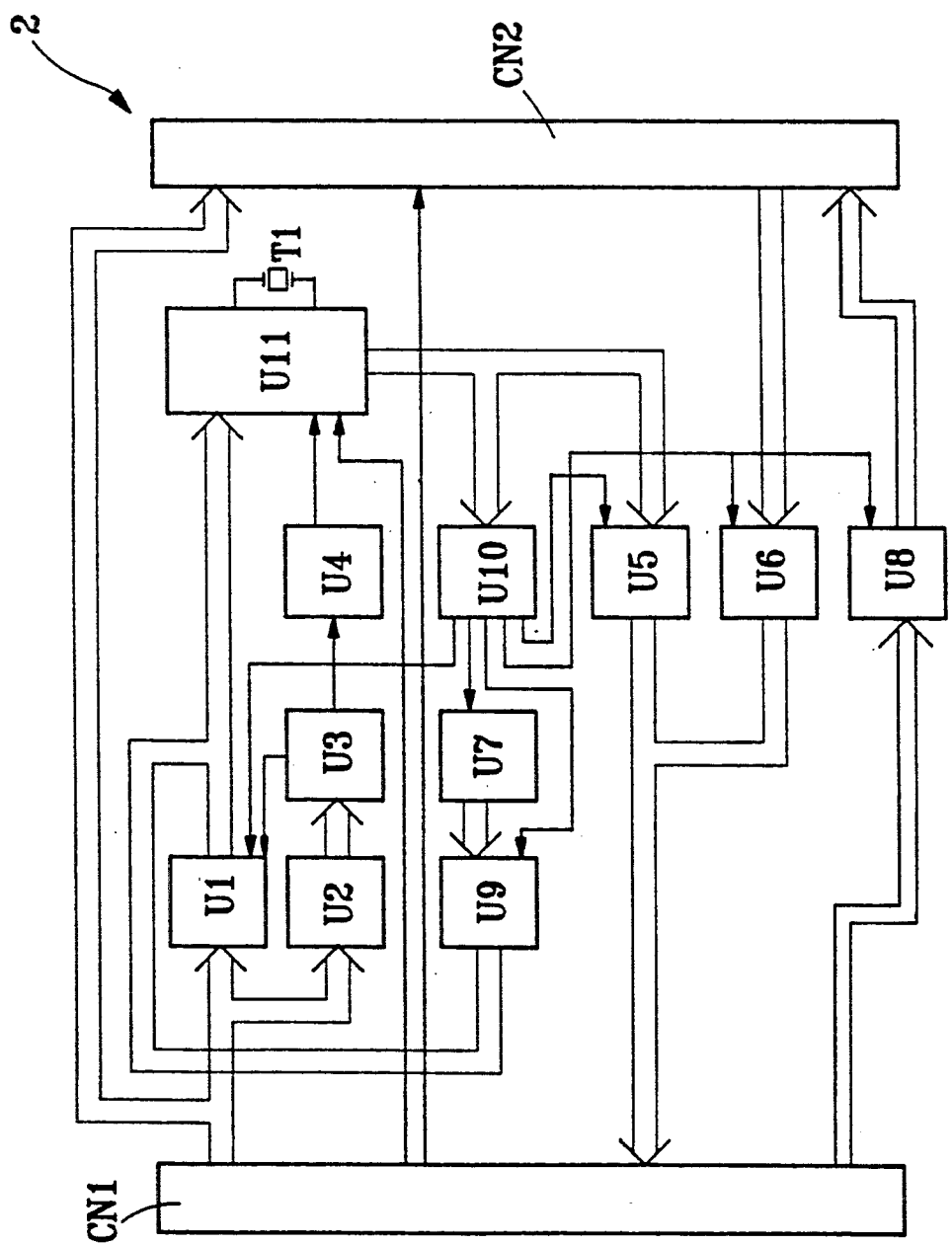
FIG. 2 illustrating a block diagram showing the system structure of the invention.

Referring to FIG. 2, in which a block drawing shows the system structure of the invention, the invented device 2 comprises: an input buffer U1 which memorizes all the data transmitted to the device 2 from the printer port 11 of a PC 1 until the CPU U11 reads them out; an input data register U2 which temporarily memorizes the input data for further processing; a comparator U3 which transfers 8-bit to 16-bit; an interrupt and flag generator U4 which provides the CPU U11 with interruption and flag signals so as to indicaate the status of the input buffer U1; an output data FIFO U5 which memorizes all the data the device 2 generates until the PC 1 reads them out according to the sequence of the input; a printer port status signal arbitrator U6 which controls the status signals for the printer port and decides if these signals are provided by the CPU U11 or by the printer parallel interface CN2; an external memory address generator U7 which provides the addresses for external memory and can be outwardly connected with a large-size memory; a printer port control signal arbitrator U8 which controls the control signals of the printer port 1 so as to decide if the printer port turns to the device 2 or directly to the printer parallel interface CN2; an external memory U9, either an RAM or an ROM available, which memorizes part of the data to describe Chinese character pictographs or graphics so that data should not be transmitted by the PC 1 to the device 2 frequently, and thus frequency of transmitting is lowered, work efficiency is raised and transmission is hastened; a logic controller U10 which controls the sequency of all the circuits in order to insure regular operation of the integrated circuit, and a central processing unit U11, the control center of the device 2 in charge of controlling, reading out, generating the transmitting out various kinds of data and signals, which is powered by the time base clock pulse supplied by oscillating crystal T1 and transmits data when the device 2 is connected with the printer port interface CN1 of a PC and the parallel interface CN2 of the printer 3, is operated according to the following procedure:

After the power of the device 2 is switched on, a self-test starts and is followed by a continuous check of the control signals of the printer port interface CN1. If the control signal is under the condition that it intends to transmit data to the printer 3, the device will transmit the data bus and the control signals received from the printer port interface CN1 to the parallel interface CN2 where the signal buses and the control signals are turned into control signals and data for the printer 3 and meanwhile, it transmits the status signals received from the printer 3 to the printer port interface CN1 so that the work of the device 2 doesn't have any effect on the transmission between the PC 1 and its printer 3. If the device 2 detects a fact that the control signal of the printer port interface CN1 of the PC doesn't intend to transmit data with the printer 3, the device 2 will break off all the signals between the CN1 and the CN2, and stands by for receiving data at any time. Then the PC 1 transmits the responding Chinese codes and the data required for pictographs to the input buffer U1 and the input data register U2 through D0 to D7 printer port CN1; and meanwhile start the comparator U3 to ensure that the data are transferred from 8-bit to 16-bit. After the transfer is completed, start the interrupt and flag generator U4 to inform the CPU U11 that the input data are all ready. At the time, the CPU U11 orders the data input subprogram to transmit the data memorized in the input buffer U1 to its memory and meanwhile, the second batch of data are allowed to be transmitted from the PC1. When the CPU U11 gets character codes and data in connection with pictographs from the input buffer U1, it first judges whether all the data required to generate pictographs are memorized in the external memory U9 of the device 20. If it is, the CPU U11 gets the data required to generate the responding pictographs based on the external memory addresses through the external memory address generator U7. If the data required to generate pictographs are not memorized in the external memory U9, it is necessary to get the data required to generate pictographs through CN1 and gets the required pictographs including the size to be enlarged or reduced, their italics, boldface, their calligraphical types (such as standard script, Lishu and round typeface) and proper ink paint (this can be done by the PC 1) by means of calculation based on the algorithm and formula built in the CPU U11, all of which are transmitted by CPU U11 to the output data FIFO U5 and memorized until the PC1 reads them out through the status signals of the printer port interface CN1 of the PC1. When the PC 1 reads the data, computer setting type, computer briefing system or other processing are to be carried on.

In view of the aforegoing description, it is known that the invention related to a Chinese pictograph or graphic generating device mounted on a printer port which is constructed based on modular design with no requirement of changing the the printer port interface of computers and printers, and can be externally installed, as required, on the printer port interface of a PC and then connected with the parallel interface of its printer so that the PC can sent forth contral signals and status signals to generate pictographic data which can be transmitted to the invented device by way of data bus, and the data, after being processed in the invented device, can be transferred to required pictures or graphics and sent back to the printer port of a PC, thus the PC can read out the required pictures or graphic from its printer port, and thus the invented device can exert high efficiency and remedy the disadvantages of lap-top and notebook-type personal computers.

Many changes and modifications in the above described embodiment of the invention can, of course, be carried out without departing from the scope thereof. Accordingly, to promote the progress in science and the useful arts, the invention is disclosed and is intended to be limited only by the scope of the appended claims.

What is claimed is:

1. A chinese pictograph or graphic generating device mounted on a printer port constructed base on a modular design, can be extenally monted, as required, between the printer port interface of the PC and the parallel interface of a printer and comprises:

- a central processing unit, the control center of the device, which can control, read, generate and transmit various data and signals;
- a buffer, which memorizes the data transmitted from the PC until the CPU read them out;
- a comparator, which transfers the 8-bit data transmitted from the output data register into the 16-bit data;
- an interrupt and flag generator, which generates interrupt and flag signals based on the data transmitted by said comparator for the CPU in order to indicated the status of said input buffer, and meanwhile, the PU is interrupted and order said subprogram to transmit the data memorized in said buffer to its memory and second batch of data are allowed to be transmitted from said PC;
- a printer port status signals arbitrator, which controls the status signals of said printer port and decides if the signal should be provided by the CPU or the parallel interface of said printer;
- a printer port control signal arbitrator, which controls the control signals of the printer port in order to turn the signals to the device or directly transmit them to the parallel interface of said printer;
- an external memory address generator, which provides addresses said external memory requires;
- an external memory, which receives Chinese codes and data related to pictograph from said CPU which reads the data out from said input buffer and transmits them to said external memory address generator where it reads out the data required to generate responding pictographs and calculates the required typeface based on the algorithm and formula built in said CPU;
- an output data FIFO, which memorizes the graphic data to be transmitted by said CPU to said PC and stands by until said PC reads out the based on the sequence of their being memorized;

a logic controller, which controls the sequence of circuits so as to maintain normal operation.

2. A Chinese pictograph or graphic generating device mounted on a printer port as claimed in claim 1 wherein the internal memory of said CPU masks and memorizes various algorithms and formulas to be applied to calculation of the pictographs we require.

3. A Chinese pictograph or graphic generating device mounted on a printer port as claimed in claim 2 wherein the external memory memorizes the responding data to describe pictographs in order to lower frequency of transmitting data between said PC and said device and thereby improving work efficiency and work speed.

4. A Chinese pictograph or graphic generating device mounted on a printer port as claimed in claim 3 wherein said external memory can be either an RAM or an ROM and can be also expanded, when required.

5. A Chinese pictograph or graphic generating device mounted on a printer port as claimed in claim 1 wherein invented device receives all the pictographic data transmitted from the PC by means of control signals through the data bus on said printer port, and then the responding data required to described pictographs are read out by the PC for further processing 25 after being processed in said device.

* * * * *